United States Patent
Wu

(10) Patent No.: US 12,193,016 B2
(45) Date of Patent: Jan. 7, 2025

(54) METHOD FOR CHANGING UPLINK GRANT, METHOD FOR SENDING INFORMATION, AND COMMUNICATIONS APPARATUS

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 536 days.

(21) Appl. No.: 17/487,602

(22) Filed: Sep. 28, 2021

(65) Prior Publication Data

US 2022/0015137 A1 Jan. 13, 2022

Related U.S. Application Data

(63) Continuation of application No. PCT/CN2020/079873, filed on Mar. 18, 2020.

(30) Foreign Application Priority Data

Mar. 28, 2019 (CN) .......................... 201910245825.2

(51) Int. Cl.
*H04W 72/23* (2023.01)
*H04W 24/10* (2009.01)

(52) U.S. Cl.
CPC ........... *H04W 72/23* (2023.01); *H04W 24/10* (2013.01)

(58) Field of Classification Search
CPC ....... H04W 72/23; H04W 72/14; H04W 8/24; H04W 24/10; H04W 72/02; H04W 72/542; H04L 1/1642; H04L 27/261; H04L 1/0001; H04L 5/0044; H04L 5/006; H04L 27/26025

See application file for complete search history.

(56) References Cited

U.S. PATENT DOCUMENTS

| | | | |
|---|---|---|---|
| 6,286,104 B1 * | 9/2001 | Buhle | H04L 63/105 |
| | | | 707/999.009 |
| 10,873,975 B2 * | 12/2020 | Freda | H04W 72/23 |
| 11,160,107 B2 * | 10/2021 | Lee | H04W 72/569 |
| 11,943,662 B2 * | 3/2024 | Sun | H04L 43/08 |
| 11,991,770 B2 * | 5/2024 | Liang | H04L 5/0062 |
| 2018/0368157 A1 | 12/2018 | Jeon | |

(Continued)

FOREIGN PATENT DOCUMENTS

| | | |
|---|---|---|
| CN | 102905382 A | 1/2013 |
| CN | 107889224 A | 4/2018 |

(Continued)

OTHER PUBLICATIONS

International Search Report & Written Opinion related to Application No. PCT/CN2020/079873; reported on Oct. 7, 2021.

(Continued)

*Primary Examiner* — Brian T O Connor
(74) *Attorney, Agent, or Firm* — von Briesen & Roper, s.c.

(57) ABSTRACT

The present disclosure provides a method for changing an uplink grant, a method for sending information, and a communications apparatus. The method for changing an uplink grant includes: in a case that a logical channel satisfies a change trigger event, changing an uplink grant usable by the logical channel.

20 Claims, 5 Drawing Sheets

(56) References Cited

U.S. PATENT DOCUMENTS

| | | | |
|---|---|---|---|
| 2019/0014596 A1* | 1/2019 | Yang | H04W 72/21 |
| 2019/0223196 A1 | 7/2019 | Yu et al. | |
| 2019/0357235 A1* | 11/2019 | Wang | H04W 72/569 |
| 2019/0387467 A1 | 12/2019 | Kishida et al. | |
| 2020/0252847 A1* | 8/2020 | Park | H04W 88/14 |
| 2020/0329493 A1* | 10/2020 | Yang | H04W 72/23 |

FOREIGN PATENT DOCUMENTS

| | | | |
|---|---|---|---|
| CN | 108024378 A | 5/2018 | |
| CN | 108616967 A | 10/2018 | |
| JP | 09121376 A | 5/1997 | |
| JP | 2018137688 A | 8/2018 | |
| WO | 2017196099 A1 | 11/2017 | |
| WO | 2018129699 A1 | 7/2018 | |
| WO | 2018141952 A1 | 8/2018 | |
| WO | 2018170777 A1 | 9/2018 | |
| WO | 2019017707 A1 | 1/2019 | |

OTHER PUBLICATIONS

Japanese First Office Action related to Application No. 2021-556609 reported on Oct. 11, 2022.
R2-1901353, Source: Nokia, Nokia Shanghai Bell, "Enhancements for Uplink PDCP Duplication" Document for: Discussion and Decision, Agenda item: 11.7.4, Release: 3G99 TSG-RAN WG2 Meeting #105, Feb.-Mar. 1, 2019, Athens, Greece.
Extended European Search Report related to Application No. 20779811.7 reported on May 3, 2022.
Chinese Office Action related to Application No. 201910245825.2 reported on Jun. 16, 2022.
Indian Office Action related to Application No. 202127049139 reported on Jun. 8, 2022.
R2-1814995, Source: Nokia, Nokia Shanghai Bell, "Scenarios for intra-UE prioritization/multiplexing" Document for: Discussion and Decision, Agenda item: 11.7.2, Release: 3G99 TSG-RAN WG2 Meeting #103bis, Oct. 8-12, 2018, Chengdu, China.
R2-1901367, Source: Ericsson, "104_40NR_IIOT PDCP duplication report of email discussion, TP" Document for; Discussion, Agreement, Agenda item: 11.7.4, Release: D3GPP TSG-RAN WG2 #105, Feb. 25-Mar. 1, 2019, Athens, Greece.
R2-1902086, Source: Intel Corporation, "Update of NR L2/3 feature lists" Document for: Discussion and decision, Agenda Item: 10.4.4.1, Release: 3GPP RAN WG2#105, Feb. 25-Mar. 1, 2019, Athens, Greece.
Japanese Second Office Action related to Application No. 2021-556609 reported on May 2, 2023.

* cited by examiner

METHOD FOR CHANGING UPLINK GRANT, METHOD FOR SENDING INFORMATION, AND COMMUNICATIONS APPARATUS

CROSS-REFERENCE TO RELATED APPLICATIONS

This application is a continuation application of International Application No. PCT/CN2020/079873 filed on Mar. 18, 2020, which claims priority to Chinese Patent Application No. 201910245825.2 filed in China on Mar. 28, 2019, both disclosures of which are incorporated herein by reference in their entireties.

TECHNICAL FIELD

The present disclosure relates to the field of communications technologies, and in particular, to a method for changing an uplink grant, a method for sending information, and a communications apparatus.

BACKGROUND

In a process of transmitting uplink data through logical channel prioritization (LCP), a network side first allocates, to a terminal, an uplink grant for sending uplink data, and then the terminal allocates, based on a logical channel prioritization restriction (LCP restriction), the uplink grant to a corresponding logical channel for uplink data transmission.

The logical channel prioritization restriction means that when the allocated uplink grant is used for transmitting new data, the network side configures, for the terminal by using a radio resource control (RRC) message, an uplink grant usable by a logical channel, where the uplink grant can be used by the logical channel when a condition is satisfied. Because the current logical channel prioritization restriction is configured by the network device statically, the uplink grant usable by the logical channel is fixed. Therefore, when a network channel condition changes, spectral efficiency may decrease and a packet loss rate may increase as a result. Consequently, reliability of data transmission is reduced.

SUMMARY

According to a first aspect, some embodiments of the present disclosure provide a method for changing an uplink grant, where the method is performed by a terminal and includes:
  in a case that a logical channel satisfies a change trigger event, changing an uplink grant usable by the logical channel.

According to a second aspect, some embodiments of the present disclosure further provide a method for sending information, where the method is performed by a network-side device and includes:
  sending configuration information, where the configuration information is used for configuring a change trigger event for a terminal, so that in a case that a logical channel satisfies the change trigger event, the terminal changes an uplink grant usable by the logical channel.

According to a third aspect, some embodiments of the present disclosure further provide a terminal, including:
  a first processing module, configured to: in a case that a logical channel satisfies a change trigger event, change an uplink grant usable by the logical channel.

According to a fourth aspect, some embodiments of the present disclosure further provide a network-side device, including:
  a sending module, configured to send configuration information, where the configuration information is used for configuring a change trigger event for a terminal, so that in a case that a logical channel satisfies the change trigger event, the terminal changes an uplink grant usable by the logical channel.

According to a fifth aspect, some embodiments of the present disclosure further provide a terminal, including a memory, a processor, and a program stored in the memory and capable of running on the processor, where when the program is executed by the processor, the steps of the method for changing an uplink grant according to the first aspect are implemented.

According to a sixth aspect, some embodiments of the present disclosure further provide a network-side device, including a memory, a processor, and a program stored in the memory and capable of running on the processor, where when the program is executed by the processor, the steps of the method for sending information according to the second aspect are implemented.

According to a seventh aspect, some embodiments of the present disclosure further provide a computer-readable storage medium, where the computer-readable storage medium stores a computer program, and when the computer program is executed by a processor, the steps of the method for changing an uplink grant according to the first aspect are implemented, or the steps of the method for sending information according to the second aspect are implemented.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains based on the embodiments of the present disclosure shall fall within the protection scope of the present disclosure.

Figure 1:
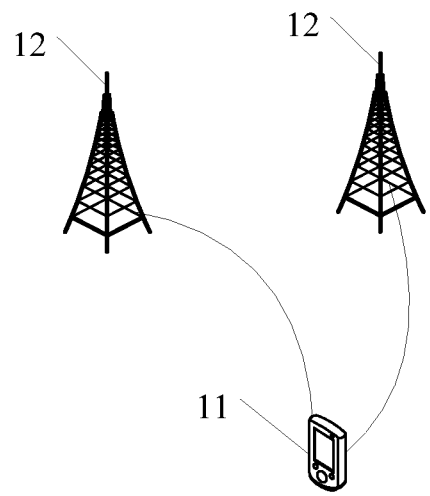
FIG. 1 is a structural diagram of a network system to which some embodiments of the present disclosure may be applied.

FIG. 1 is a schematic diagram of a network to which some embodiments of the present disclosure may be applied. As shown in FIG. 1, the network includes a terminal 11 and a network-side device 12. The terminal 11 may be a terminal-side device such as a mobile phone, a tablet personal computer, a laptop computer, a personal digital assistant (PDA), a mobile Internet device (MID), or a wearable device. It should be noted that a specific type of the terminal 11 is not limited in some embodiments of the present disclosure. The network-side device 12 may be a macro base station, an LTE eNB, a 5G NR NB, or the like. Alternatively, the network-side device 12 may be a small cell, for example, a small cell such as a low power node (LPN) pico or femto, or the network-side device 12 may be an access point (AP). Alternatively, the network-side device 12 may be a network node formed by a central unit (CU) and a plurality of transmission reception points (TRP) managed and controlled by the central unit. It should be noted that a specific type of the network-side device 12 is not limited in some embodiments of the present disclosure.

Figure 2:
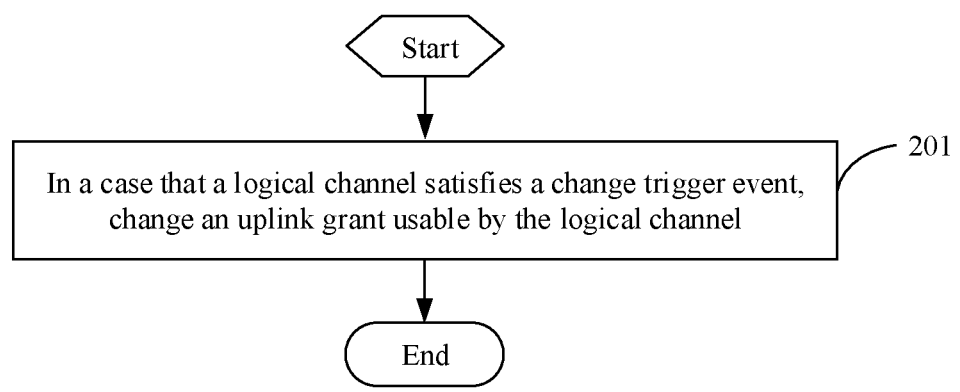
FIG. 2 is a flowchart of a method for changing an uplink grant according to some embodiments of the present disclosure.

FIG. 2 is a flowchart of a method for changing an uplink grant according to some embodiments of the present disclosure, where the method is performed by a terminal 11. As shown in FIG. 2, the method includes the following steps.

Step 201: In a case that a logical channel satisfies a change trigger event, change an uplink grant usable by the logical channel.

In this embodiment, in the case that the logical channel satisfies the change trigger event, the terminal may change the uplink grant usable by the logical channel, so that the terminal can dynamically change the uplink grant usable by the logical channel after the change trigger event is satisfied. Therefore, decrease of spectral efficiency and increase of a packet loss rate are less probable, and data transmission is more reliable.

Before step 201, a network-side device may configure the uplink grant usable by the logical channel for the terminal by using a radio resource control (RRC) message.

Whether the logical channel can use the configured uplink grant for new data transmission is determined by whether the uplink grant satisfies a logical channel prioritization restriction condition. The logical channel prioritization restriction condition usually includes at least one of the following:
  whether a subcarrier spacing (SCS) of the uplink grant is a subcarrier spacing configured by a network;
  whether a physical uplink shared channel (PUSCH) interval (that is, PUSCH duration) of the uplink grant is a PUSCH interval configured by the network;
  whether a type of the uplink grant is a configured grant type 1 (that is, Configured Grant Type 1); or
  whether a cell corresponding to the uplink grant is a cell configured by the network, and the like.

Specifically, in step 201, the changing an uplink grant usable by the logical channel may include: changing at least one of a subcarrier spacing, a physical uplink shared channel range, a type, or a cell that are corresponding to the uplink grant usable by the logical channel, so that the terminal can dynamically change the uplink grant usable by the logical channel in a flexible manner.

For example, the terminal may change a current subcarrier spacing corresponding to the uplink grant usable by the logical channel to a target subcarrier spacing, where the target subcarrier spacing is a subcarrier spacing other than the current subcarrier spacing; or the terminal may change a current cell corresponding to the uplink grant usable by the logical channel to a target cell. The target cell is a cell other than the current cell. Specifically, for example, the network-side device configures, for the terminal, a cell 1 corresponding to an uplink grant usable by a logical channel 1 (data of the logical channel 1 can be sent only by using an uplink grant of the cell 1). When the logical channel 1 satisfies the change trigger event, the terminal changes the cell (that is, the current cell) corresponding to the uplink grant usable by the logical channel 1 from the cell 1 to a cell 2.

In a specific embodiment of the present disclosure, the change trigger event may be prescribed by a protocol; or before step 201, the method may further include: receiving configuration information, where the configuration information is used for configuring the change trigger event for the terminal.

The change trigger event may be any event used to evaluate whether the terminal changes the uplink grant usable by the logical channel. Specifically, the change trigger event includes at least one of the following:
  a data packet loss rate of the logical channel is greater than or equal to a first packet loss rate threshold;
  a data transmission delay of the logical channel is greater than or equal to a first delay threshold;
  a measurement result of a cell corresponding to the uplink grant usable by the logical channel satisfies a first preset condition; or
  a measurement result of a target cell satisfies a second preset condition, where the target cell is a cell corresponding to a changed uplink grant usable by the logical channel.

For example, in a case that the configuration information includes the cell 1 corresponding to the uplink grant usable by the logical channel 1, assuming that the first packet loss rate threshold is 10%, in a case that the data packet loss rate of the logical channel 1 is greater than or equal to 10%, the terminal changes the cell corresponding to the uplink grant usable by the logical channel 1 to the cell 2; or
  assuming that the first delay threshold is 20 ms, in a case that the data transmission delay of the logical channel 1 is greater than or equal to 20 ms, the terminal changes the cell corresponding to the uplink grant usable by the logical channel 1 to the cell 2; or
  in a case that the data packet loss rate of the logical channel 1 is greater than or equal to 10%, and the data transmission delay of the logical channel 1 is greater than or equal to 20 ms, the terminal changes the cell corresponding to the uplink grant usable by the logical channel 1 to the cell 2, or the like.

It should be noted that the first preset condition may be a preset condition for evaluating the measurement result of the cell corresponding to the uplink grant usable by the logical channel, and in a case that the measurement result of the cell corresponding to the uplink grant usable by the logical channel satisfies the first preset condition, the terminal may change the cell corresponding to the uplink grant usable by the logical channel to the target cell (for example, change the cell 1 to the cell 2); likewise, the second preset condition may be a preset condition for evaluating the measurement result of the target cell, and in a case that the measurement result of the target cell satisfies the second preset condition, the terminal may change the cell corresponding to the uplink grant usable by the logical channel to the target cell.

Certainly, there may be an association between the first preset condition and the second preset condition. For example, the first preset condition is that the measurement result is greater than or equal to a threshold 1, and the second preset condition is that the measurement result is less than the threshold 1; or there may be no association between the first preset condition and the second preset condition. This is not limited herein.

In addition, the measurement result is a measurement result of a radio resource control (RRC) measurement performed by the terminal on the cell. Specifically, the measurement result may include at least one of the following:
  reference signal received power (RSRP);
  reference signal received quality (RSRQ);
  signal to interference plus noise ratio (SINR);
  received signal strength indication (RSSI);
  channel occupancy ratio (CR); or channel busy ratio (CBR), and the like.

For example, in a case that the change trigger event is that the measurement result of the cell corresponding to the uplink grant usable by the logical channel satisfies the first preset condition, the first preset condition may be: an RSRQ threshold of the cell 1 is less than a threshold 1, or a CR threshold of the cell 1 reaches or exceeds a threshold 2; or
  in a case that the change trigger event is that the measurement result of the target cell satisfies the second preset condition, the second preset condition may be: if an RSRQ threshold of the cell 2 reaches or exceeds a threshold 3, or a CR threshold of the cell 2 is less than a threshold 4; or
  the change trigger event may be that the measurement result of the cell corresponding to the uplink grant usable by the logical channel satisfies the first preset condition, and that the measurement result of the target cell satisfies the second preset condition, for example, an RSRQ threshold of the cell 1 is less than a threshold 1 and an RSRQ threshold of the cell 2 reaches or exceeds a threshold 3, or a CR threshold of the cell 1 reaches or exceeds a threshold 2 and a CR threshold of the cell 2 is less than a threshold 4. In this case, the terminal changes the cell corresponding to the uplink grant usable by the logical channel 1 to the cell 2.

It should be noted that the threshold 1 may be the same as or different from the threshold 3, and that the threshold 2 may be the same as or different from the threshold 4.

In this implementation, the cell corresponding to the uplink grant usable by the logical channel may include only one cell, or the cell corresponding to the uplink grant usable by the logical channel may include a plurality of cells. This is not limited herein.

Specifically, the cell corresponding to the uplink grant usable by the logical channel includes a plurality of cells; and in a case that the change trigger event includes that a measurement result of a cell corresponding to the uplink grant usable by the logical channel satisfies a first preset condition, the measurement result of the cell corresponding to the uplink grant usable by the logical channel may include any one of the following:
  a measurement result of a cell with a highest measurement value among the plurality of cells;
  a measurement result of a cell with a lowest measurement value among the plurality of cells;
  an average measurement result of the plurality of cells; or
  an average measurement result of at least two cells that satisfy a third preset condition among the plurality of cells.

Herein, in the case that the cell corresponding to the uplink grant usable by the logical channel includes a plurality of cells, the terminal can obtain the measurement result of the cell corresponding to the uplink grant usable by the logical channel in a plurality of manners, so that a manner of obtaining the measurement result of the cell corresponding to the uplink grant usable by the logical channel is flexible.

The measurement value is a measurement value of a measurement result of each cell, and the measurement value may be a parameter value of at least one of parameters such as RSRP, RSRQ, SINR, RSSI, CR, or CBR. For example, when the measurement value is the RSRQ, the measurement result of the cell corresponding to the uplink grant usable by the logical channel may be the highest RSRQ; or when the measurement value is the CR, the measurement result of the cell corresponding to the uplink grant usable by the logical channel may be the lowest CR. This is not limited herein.

In addition, the third preset condition may be a preset condition for evaluating whether to select the at least two cells. For example, the third preset condition may be that the measurement value is greater than or equal to a first threshold, or the third preset condition may be that the measurement value is less than or equal to a second threshold, or a fixed quantity of cells with larger measurement values are selected.

For example, assuming that the measurement result is the RSRP, and that the third preset condition is that the RSRP is greater than or equal to a threshold 5, in the case that the cell corresponding to the uplink grant usable by the logical channel includes a plurality of cells, the terminal uses an average measurement result of cells whose RSRP is greater than or equal to the threshold 5 among the plurality of cells as the measurement result of the cell corresponding to the uplink grant usable by the logical channel.

It should be noted that the third preset condition may be associated or not associated with the first preset condition and the second preset condition. This is not limited either herein.

In this implementation, in a case that the terminal changes the cell corresponding to the uplink grant usable by the logical channel to the target cell, the target cell may be set to a cell that satisfies a condition, to satisfy a requirement after the change.

Specifically, the target cell may satisfy at least one of the following:
  if the data packet loss rate of the logical channel is greater than or equal to the first packet loss rate threshold, a data packet loss rate corresponding to the target cell is less than or equal to a second packet loss rate threshold;
  if the data transmission delay of the logical channel is greater than or equal to the first delay threshold, a data transmission delay corresponding to the target cell is less than or equal to a second delay threshold; or
  the measurement result of the target cell satisfies a fourth preset condition.

It should be noted that the first packet loss rate threshold may be greater than or equal to the second packet loss rate threshold, or the first packet loss rate threshold may be less than the second packet loss rate threshold; likewise, the first delay threshold may be greater than or equal to the second delay threshold, or the first delay threshold may be less than the second delay threshold. The first packet loss rate threshold, the second packet loss rate threshold, the first delay threshold, and the second delay threshold may be set based on actual requirements.

In addition, the fourth preset condition may be associated or not associated with the first preset condition, the second preset condition, and the third preset condition. The first preset condition, the second preset condition, and the third preset condition, and the fourth preset condition may be all configured by a network side or prescribed by a protocol.

For example, assuming that the fourth preset condition is that the RSRQ is greater than or equal to a threshold 6, in a case that the packet loss rate of the logical channel 1 is greater than or equal to 10%, or the data transmission delay of the logical channel is greater than or equal to 20 ms, if the RSRQ of the cell 2 is greater than or equal to the threshold 6, the terminal changes the cell corresponding to the uplink grant usable by the logical channel 1 from the cell 1 to the cell 2.

In some embodiments of the present disclosure, in step 201, in a case that the terminal determines that the logical channel satisfies the change trigger event, the terminal may immediately change the uplink grant usable by the logical channel, for example, switch the cell corresponding to the uplink grant from the cell corresponding to the uplink grant usable by the logical channel to the target cell.

Alternatively, the changing an uplink grant usable by the logical channel includes:
  in a case that a preset duration is reached after the logical channel satisfies the change trigger event, changing the uplink grant usable by the logical channel.

Herein, when the preset duration is reached after the logical channel satisfies the change trigger event, the terminal changes the uplink grant, to reduce a change frequency and reduce power consumption of the terminal.

The preset duration may be preconfigured by the network side or prescribed by a protocol. For example, the network side may configure a duration for a timer in the terminal, such as 1 s or 2 s. When the logical channel satisfies the change trigger event, the timer is started. When the timer expires, the terminal changes the uplink grant usable by the logical channel.

In addition, because the terminal is in a waiting state in a period of time after the logical channel satisfies the change trigger event and before the preset duration is reached, a condition can also be set, so that the terminal changes the uplink grant usable by the logical channel if the condition is satisfied when the preset duration is reached, or that the terminal skips changing the uplink grant usable by the logical channel if the condition is not satisfied when the preset duration is reached.

Specifically, in a case that the preset duration is reached after the logical channel satisfies the change trigger event, the changing the uplink grant usable by the logical channel may include:
  in a case that the preset duration is reached after the logical channel satisfies the change trigger event and that the logical channel still satisfies the change trigger event, changing the uplink grant usable by the logical channel.

Herein, the terminal changes the uplink grant usable by the logical channel only in the case that the preset duration is reached after the logical channel satisfies the change trigger event, and the logical channel satisfies the change trigger event, so that it is more reasonable to change the uplink grant usable by the logical channel.

For example, the protocol prescribes that a timer 1 in the terminal has a timing duration of 2 s. When the logical channel 1 satisfies the change trigger event, the timer is started. When the timer reaches 2 s, if the logical channel 1 still satisfies the change trigger event, the terminal changes the cell corresponding to the uplink grant usable by the logical channel 1 from the cell 1 to the cell 2.

In another implementation, after the receiving first configuration information, the method may further include:
  before the preset duration is reached after the logical channel satisfies the change trigger event, if the logical channel satisfies a non-change trigger event, skipping changing the uplink grant usable by the logical channel.

Herein, before the preset duration is reached after the logical channel satisfies the change trigger event, if the logical channel satisfies a non-change trigger event, the terminal skips changing the uplink grant usable by the logical channel, so that the terminal can cancel in time, in the process of waiting for changing the uplink grant usable by the logical channel, execution of continuing to change the uplink grant.

For example, the protocol prescribes that a timer 1 in the terminal has a timing duration of 2 s. When the logical channel 1 satisfies the change trigger event, the timer is started. Before the timer reaches 2 s, if the logical channel 1 satisfies a non-change trigger event, the terminal skips changing the cell corresponding to the uplink grant usable by the logical channel 1.

It should be noted that the change trigger event may be preconfigured by the network side or prescribed by the protocol, and that the change trigger event may include at least one of the following:
  manner 1: the data packet loss rate of the logical channel reaches or is lower than a third packet loss rate threshold, and the third packet loss rate threshold may be the same as or different from the first packet loss rate threshold;
  manner 2: the data transmission delay of the logical channel reaches or is lower than a third delay threshold, and the third delay threshold may be the same as or different from the first delay threshold;
  manner 3: in the manners 1 and 2, the configuration of the uplink grant to be changed does not satisfy a preset condition 1, for example, the measurement result of the target cell does not satisfy a fifth preset condition, where the fifth preset condition may be the same as or different from the fourth preset condition, for example, the RSRP of the target cell is less than or equal to a threshold 7, and the threshold 7 is less than or equal to the threshold 6 or may be greater than the threshold 6; or
  manner 4: the configuration of the uplink grant to be changed does not satisfy a preset condition 2, for example,
  the measurement result of the cell corresponding to the uplink grant usable by the logical channel does not satisfy a sixth preset condition, and the sixth preset condition may be the same as or different from the first preset condition, for example, the CR of the cell corresponding to the uplink grant usable by the logical channel is less than or equal to the threshold 7, or the RSRP of the cell corresponding to the uplink grant usable by the logical channel is greater than or equal to a threshold 8; or the measurement result of the target cell does not satisfy a seventh preset condition, for example, the CR of the target cell is greater than or equal to a threshold 9, or the RSRP of the target cell is less than or equal to a threshold 10, or the like; or the measurement result of the cell corresponding to the uplink grant usable by the logical channel does not satisfy a sixth preset condition, and the measurement result of the target cell does not satisfy a seventh preset condition, or the like.

In a specific embodiment of the present disclosure, after the changing an uplink grant usable by the logical channel, the method further includes: sending indication information, where the indication information is used to indicate the change of the uplink grant, so that the network-side device can be notified in time that the terminal has changed the uplink grant usable by the logical channel, so that the network side makes a timely adjustment.

The indication information may include any information that can be used to indicate the change of the uplink grant. Specifically, the indication information may include: an identifier of at least one of a subcarrier spacing, a physical uplink shared channel range, a type, or a cell that are corresponding to the changed uplink grant; or a sequence number of the logical channel and the identifier.

For example, in a case that the terminal changes the cell corresponding to the uplink grant usable by the logical channel 1 from the cell 1 to the cell 2, the terminal may send indication information 1 to the network-side device, where the indication information 1 may include a cell identifier of the cell 2, or a cell identifier of the cell 2 and a logical channel number of the logical channel 1, or the like.

In some embodiments of the present disclosure, in the case that the logical channel satisfies the change trigger event, the uplink grant usable by the logical channel is changed, so that the terminal can dynamically change the uplink grant usable by the logical channel after the change trigger event is satisfied. Therefore, a possibility of decrease of spectral efficiency and increase of the packet loss rate is reduced, and reliability of data transmission is improved.

Figure 3:
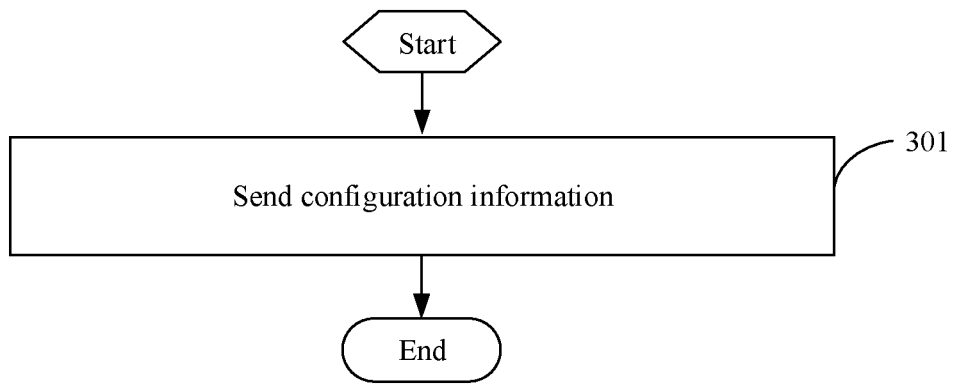
FIG. 3 is a flowchart of sending information according to some embodiments of the present disclosure.

FIG. 3 is a flowchart of sending information according to some embodiments of the present disclosure, performed by a network-side device. As shown in FIG. 3, the method for sending information includes the following step.

Step 301: Send configuration information, where the configuration information is used for configuring a change trigger event for a terminal, so that in a case that a logical channel satisfies the change trigger event, the terminal changes an uplink grant usable by the logical channel.

Optionally, the change trigger event includes at least one of the following:

a data packet loss rate of the logical channel is greater than or equal to a first packet loss rate threshold;

a data transmission delay of the logical channel is greater than or equal to a first delay threshold;

a measurement result of a cell corresponding to the uplink grant usable by the logical channel satisfies a first preset condition; or a measurement result of a target cell satisfies a second preset condition, where the target cell is a cell corresponding to the changed uplink grant usable by the logical channel.

Optionally, after step 301, the method further includes:

receiving indication information, where the indication information is used to indicate the change of the uplink grant usable by the logical channel.

Optionally, the indication information includes:

an identifier of at least one of a subcarrier spacing, a physical uplink shared channel range, a type, or a cell that are corresponding to a changed uplink grant; or a sequence number of the logical channel and the identifier.

It should be noted that for specific implementations of some embodiments of the present disclosure as embodiments of the network-side device corresponding to the embodiment shown in FIG. 2, reference may be made to the related descriptions of the embodiment shown in FIG. 2, and the same beneficial effect can be achieved. To avoid repetition, details are not described herein again.

Figure 4:
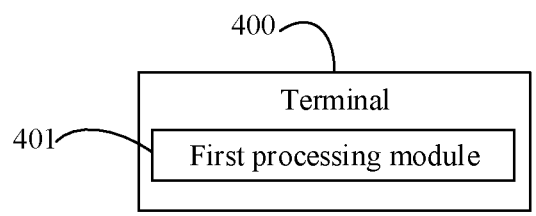
FIG. 4 is a structural diagram of a terminal according to some embodiments of the present disclosure.

FIG. 4 is a structural diagram of a terminal according to some embodiments of the present disclosure. As shown in FIG. 4, the terminal 400 includes:

a first processing module 401, configured to: in a case that a logical channel satisfies a change trigger event, change an uplink grant usable by the logical channel.

Optionally, the first processing module 401 is specifically configured to:

change at least one of a subcarrier spacing, a physical uplink shared channel range, a type, or a cell that are corresponding to the uplink grant usable by the logical channel.

Optionally, the change trigger event includes at least one of the following:

a data packet loss rate of the logical channel is greater than or equal to a first packet loss rate threshold;

a data transmission delay of the logical channel is greater than or equal to a first delay threshold;

a measurement result of a cell corresponding to the uplink grant usable by the logical channel satisfies a first preset condition; or a measurement result of a target cell satisfies a second preset condition, where the target cell is a cell corresponding to a changed uplink grant usable by the logical channel.

Optionally, the cell corresponding to the uplink grant usable by the logical channel includes a plurality of cells; and in a case that the change trigger event includes that a measurement result of a cell corresponding to the uplink grant usable by the logical channel satisfies a first preset condition, the measurement result of the cell corresponding to the uplink grant usable by the logical channel includes any one of the following:

a measurement result of a cell with a highest measurement value among the plurality of cells;

a measurement result of a cell with a lowest measurement value among the plurality of cells;

an average measurement result of the plurality of cells; or an average measurement result of at least two cells that satisfy a third preset condition among the plurality of cells.

Optionally, the measurement result includes at least one of the following:

reference signal received power (RSRP);

reference signal received quality (RSRQ);

signal to interference plus noise ratio (SINR);

received signal strength indication (RSSI);

channel occupancy ratio (CR); or channel busy ratio (CBR).

Optionally, the target cell satisfies at least one of the following:
- in a case that the data packet loss rate of the logical channel is greater than or equal to the first packet loss rate threshold, a data packet loss rate corresponding to the target cell is less than or equal to a second packet loss rate threshold;
- in a case that the data transmission delay of the logical channel is greater than or equal to the first delay threshold, a data transmission delay corresponding to the target cell is less than or equal to a second delay threshold; or
- the measurement result of the target cell satisfies a fourth preset condition.

Optionally, the first processing module 401 is specifically configured to:
- in a case that a preset duration is reached after the logical channel satisfies the change trigger event, change the uplink grant usable by the logical channel.

Optionally, the first processing module 401 is specifically configured to:
- in a case that the preset duration is reached after the logical channel satisfies the change trigger event and that the logical channel still satisfies the change trigger event, change the uplink grant usable by the logical channel.

Figure 5:
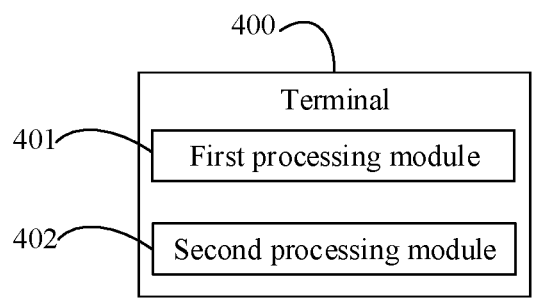
FIG. 5 is another structural diagram of a terminal according to some embodiments of the present disclosure.

Optionally, as shown in FIG. 5, the terminal 400 further includes:
- a second processing module 402, configured to: before the preset duration is reached after the logical channel satisfies the change trigger event, if the logical channel satisfies a non-change trigger event, skip changing the uplink grant usable by the logical channel.

Figure 6:
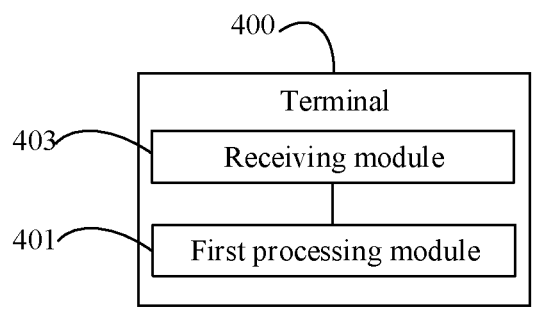
FIG. 6 is another structural diagram of a terminal according to some embodiments of the present disclosure.

Optionally, the change trigger event is prescribed by a protocol; or
as shown in FIG. 6, the terminal 400 further includes:
- a receiving module 403, configured to receive configuration information, where the configuration information is used for configuring the change trigger event for the terminal.

Figure 7:
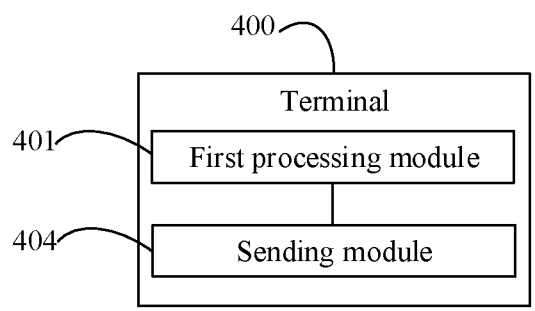
FIG. 7 is another structural diagram of a terminal according to some embodiments of the present disclosure.

Optionally, as shown in FIG. 7, the terminal 400 further includes:
- a sending module 404, configured to send indication information, where the indication information is used to indicate the change of the uplink grant.

Optionally, the indication information includes:
- an identifier of at least one of a subcarrier spacing, a physical uplink shared channel range, a type, or a cell that are corresponding to the changed uplink grant; or
- a sequence number of the logical channel and the identifier.

It should be noted that the terminal 400 in some embodiments of the present disclosure may be a terminal in any implementation of the method embodiment. Any implementation of the terminal in the method embodiment can be implemented by the terminal 400 in some embodiments of the present disclosure, and the same beneficial effect can be achieved. To avoid repetition, details are not described herein again.

Figure 8:
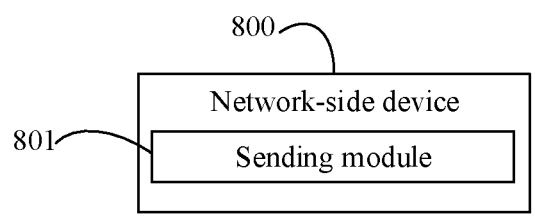
FIG. 8 is a structural diagram of a network-side device according to some embodiments of the present disclosure.

FIG. 8 is a structural diagram of a network-side device according to some embodiments of the present disclosure. As shown in FIG. 8, the network-side device 800 includes:
- a sending module 801, configured to send configuration information, where the configuration information is used for configuring a change trigger event for a terminal, so that in a case that a logical channel satisfies the change trigger event, the terminal changes an uplink grant usable by the logical channel.

Optionally, the change trigger event includes at least one of the following:
- a data packet loss rate of the logical channel is greater than or equal to a first packet loss rate threshold;
- a data transmission delay of the logical channel is greater than or equal to a first delay threshold;
- a measurement result of a cell corresponding to the uplink grant usable by the logical channel satisfies a first preset condition; or
- a measurement result of a target cell satisfies a second preset condition, where the target cell is a cell corresponding to a changed uplink grant usable by the logical channel.

Figure 9:
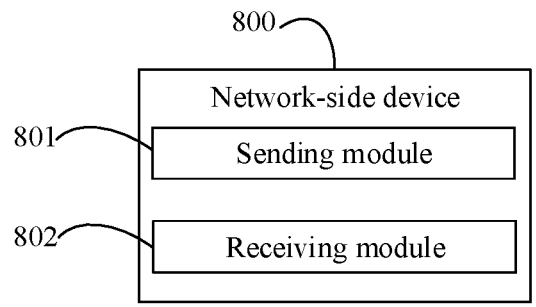
FIG. 9 is another structural diagram of a network-side device according to some embodiments of the present disclosure.

Optionally, as shown in FIG. 9, the network-side device 800 further includes:
- a receiving module 802, configured to receive indication information, where the indication information is used to indicate the change of the uplink grant usable by the logical channel.

Optionally, the indication information includes:
- an identifier of at least one of a subcarrier spacing, a physical uplink shared channel range, a type, or a cell that are corresponding to a changed uplink grant; or
- a sequence number of the logical channel and the identifier.

It should be noted that the network-side device 800 in some embodiments of the present disclosure may be a network-side device in any implementation of the method embodiment. Any implementation of the network-side device in the method embodiment can be implemented by the network-side device 800 in some embodiments of the present disclosure, and the same beneficial effect can be achieved. To avoid repetition, details are not described herein again.

Figure 10:
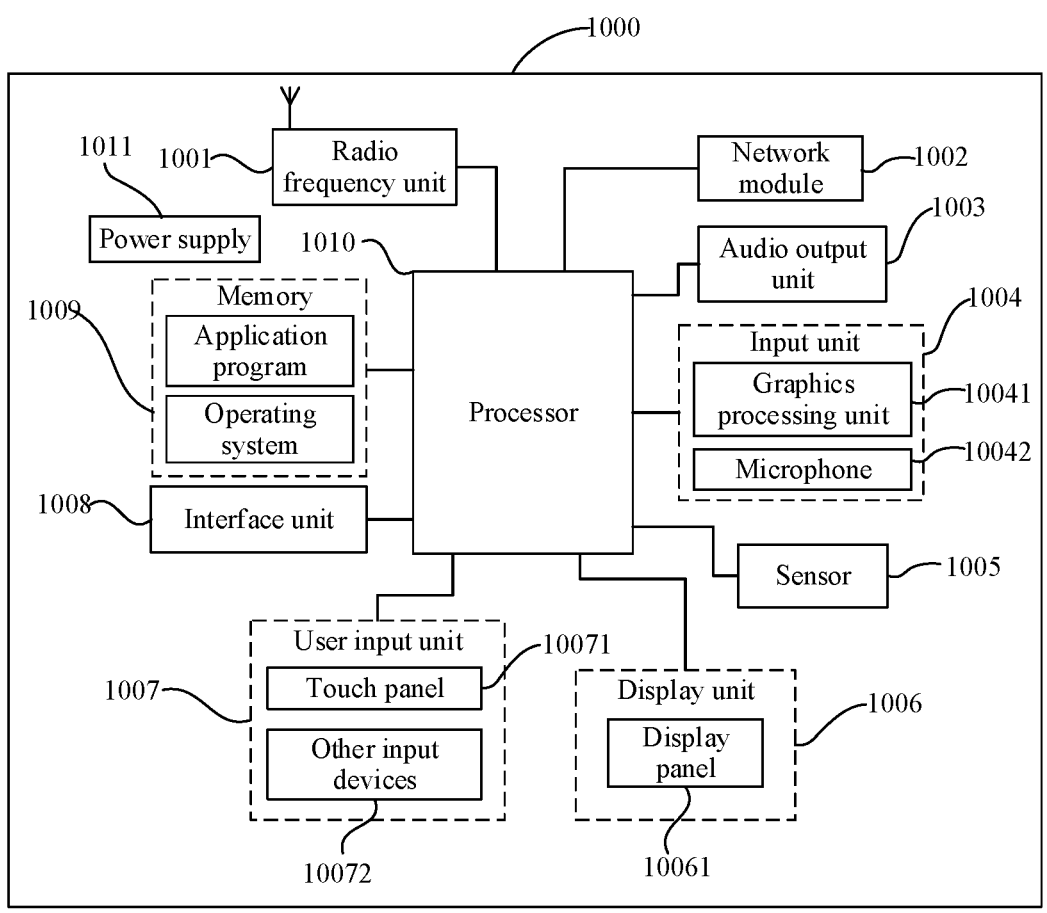
FIG. 10 is another structural diagram of a terminal according to some embodiments of the present disclosure.

FIG. 10 is a schematic diagram of a hardware structure of a terminal that implements the embodiments of the present disclosure. The terminal 1000 may include but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the structure of the terminal 1000 shown in FIG. 10 does not constitute a limitation on the terminal. A quantity of components included in the terminal may be greater or less than that shown in the figure, or some components are combined, or component arrangements are different. In some embodiments of the present disclosure, the terminal includes but is not limited to a mobile phone, a tablet computer, a laptop computer, a palmtop computer, an in-vehicle terminal, a wearable device, a pedometer, and the like.

The processor 1010 is configured to:
- in a case that a logical channel satisfies a change trigger event, change an uplink grant usable by the logical channel.

Optionally, the processor 1010 is specifically configured to:
- change at least one of a subcarrier spacing, a physical uplink shared channel range, a type, or a cell that are corresponding to the uplink grant usable by the logical channel.

Optionally, the change trigger event includes at least one of the following:

a data packet loss rate of the logical channel is greater than or equal to a first packet loss rate threshold;

a data transmission delay of the logical channel is greater than or equal to a first delay threshold;

a measurement result of a cell corresponding to the uplink grant usable by the logical channel satisfies a first preset condition; or a measurement result of a target cell satisfies a second preset condition, where the target cell is a cell corresponding to a changed uplink grant usable by the logical channel.

Optionally, the cell corresponding to the uplink grant usable by the logical channel includes a plurality of cells; and in a case that the change trigger event includes that a measurement result of a cell corresponding to the uplink grant usable by the logical channel satisfies a first preset condition, the measurement result of the cell corresponding to the uplink grant usable by the logical channel includes any one of the following:

a measurement result of a cell with a highest measurement value among the plurality of cells;

a measurement result of a cell with a lowest measurement value among the plurality of cells;

an average measurement result of the plurality of cells; or an average measurement result of at least two cells that satisfy a third preset condition among the plurality of cells.

Optionally, the measurement result includes at least one of the following:

reference signal received power (RSRP);
reference signal received quality (RSRQ);
signal to interference plus noise ratio (SINR);
received signal strength indication (RSSI);
channel occupancy ratio (CR); or channel busy ratio (CBR).

Optionally, the target cell satisfies at least one of the following:

in a case that the data packet loss rate of the logical channel is greater than or equal to the first packet loss rate threshold, a data packet loss rate corresponding to the target cell is less than or equal to a second packet loss rate threshold;

in a case that the data transmission delay of the logical channel is greater than or equal to the first delay threshold, a data transmission delay corresponding to the target cell is less than or equal to a second delay threshold; or the measurement result of the target cell satisfies a fourth preset condition.

Optionally, the processor 1010 is specifically configured to:

in a case that a preset duration is reached after the logical channel satisfies the change trigger event, change the uplink grant usable by the logical channel.

Optionally, the processor 1010 is specifically configured to:

in a case that the preset duration is reached after the logical channel satisfies the change trigger event and that the logical channel still satisfies the change trigger event, change the uplink grant usable by the logical channel.

Optionally, the processor 1010 is further configured to:

before the preset duration is reached after the logical channel satisfies the change trigger event, if the logical channel satisfies a non-change trigger event, skip changing the uplink grant usable by the logical channel.

Optionally, the change trigger event is prescribed by a protocol; or the radio frequency unit 1001 is configured to:
receive configuration information, where the configuration information is used for configuring the change trigger event for the terminal.

Optionally, the radio frequency unit 1001 is further configured to:

send indication information, where the indication information is used to indicate the change of the uplink grant.

Optionally, the indication information includes:

an identifier of at least one of a subcarrier spacing, a physical uplink shared channel range, a type, or a cell that are corresponding to the changed uplink grant; or a sequence number of the logical channel and the identifier.

It should be noted that the terminal 1000 in this embodiment can implement each process implemented by the terminal in the foregoing method embodiment of the present disclosure, with the same beneficial effect achieved. To avoid repetition, details are not described herein again.

It should be understood that in some embodiments of the present disclosure, the radio frequency unit 1001 may be configured to: receive and send signals in an information receiving/sending process or a call process; and specifically, after receiving downlink data from a base station, send the downlink data to the processor 1010 for processing, and in addition, send uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The terminal provides wireless broadband Internet access for a user by using the network module 1002, for example, helps the user send and receive e-mails, browse web pages, and access streaming media.

The audio output unit 1003 may convert audio data received by the radio frequency unit 1001 or the network module 1002 or stored in the memory 1009 into an audio signal, and output the audio signal as a sound. In addition, the audio output unit 1003 may further provide an audio output (for example, a call signal received sound or a message received sound) related to a specific function performed by the terminal 1000. The audio output unit 1003 includes a speaker, a buzzer, a phone receiver, and the like.

The input unit 1004 is configured to receive an audio or video signal. The input unit 1004 may include a graphics processing unit (GPU) 10041 and a microphone 10042. The graphics processing unit 10041 processes image data of a still picture or a video obtained by an image capture apparatus (for example, a camera) in an image capture mode or a video capture mode. A processed image frame may be displayed on the display unit 1006. An image frame processed by the graphics processing unit 10041 may be stored in the memory 1009 (or another storage medium) or sent by the radio frequency unit 1001 or the network module 1002. The microphone 10042 can receive a sound and can process the sound into audio data. The processed audio data can be converted in a telephone call mode into a format that can be sent to a mobile communications base station through the radio frequency unit 1001, for outputting.

The terminal 1000 further includes at least one sensor 1005, for example, an optical sensor, a motion sensor, and another sensor. Specifically, the optical sensor includes an ambient light sensor and a proximity sensor. The ambient light sensor may adjust luminance of a display panel 10061 based on brightness of ambient light. The proximity sensor may turn off the display panel 10061 and/or backlight when the terminal 1000 moves to an ear. As a type of motion sensor, an accelerometer sensor can detect magnitudes of accelerations in all directions (generally three axes), can detect a magnitude and a direction of gravity when the terminal is stationary, and can be performed by terminal posture recognition (such as screen switching between landscape and portrait, related games, and magnetometer posture calibration), functions related to vibration recognition (such as a pedometer and tapping), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive input digit or character information, and generate a key signal input related to a user setting and function control of the UE. Specifically, the user input unit 1007 includes a touch panel 10071 and other input devices 10072. The touch panel 10071, also referred to as a touchscreen, may capture a touch operation performed by the user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 1010, and receives and executes a command sent by the processor 1010. In addition, the touch panel 10071 may be implemented in a plurality of forms, for example, a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (such as a volume control key or a power on/off key), a trackball, a mouse, a joystick, and the like. Details are not described herein.

Further, the touch panel 10071 may cover the display panel 10061. After the touch panel 10071 detects a touch operation on or near the touch panel, the touch panel 10071 transmits the touch operation to the processor 1010 to determine a type of a touch event. Then the processor 1010 provides a corresponding visual output on the display panel 10061 based on the type of the touch event. Although the touch panel 10071 and the display panel 10061 are used as two independent components to implement input and output functions of the terminal in FIG. 10, the touch panel 10071 and the display panel 10061 may be integrated to implement the input and output functions of the terminal in some embodiments. This is not specifically limited herein.

The interface unit 1008 is an interface for connecting an external apparatus to the terminal 1000. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 1008 may be configured to receive an input (for example, data information or power) from an external apparatus, and transmit the received input to one or more components in the terminal 1000, or may be configured to transmit data between the terminal 1000 and an external apparatus.

The memory 1009 may be configured to store a software program and various data. The memory 1009 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1009 may include a high-speed random access memory, or may include a non-volatile memory, for example, at least one magnetic disk storage device, a flash memory, or other non-volatile solid-state storage devices.

The processor 1010 is a control center of the UE. The processor 1010 uses various interfaces and lines to connect all parts of the entire UE, and performs various functions and data processing of the UE by running or executing the software program and/or module stored in the memory 1009 and invoking data stored in the memory 1009, thereby performing overall monitoring on the UE. The processor 1010 may include one or more processing units. Optionally, the processor 1010 may integrate an application processor and a modem processor. The application processor mainly processes the operating system, a user interface, an application program, and the like. The modem processor mainly processes wireless communication. It may be understood that the modem processor may alternatively not be integrated into the processor 1010.

The terminal 1000 may further include the power supply 1011 (for example, a battery) supplying power to all components. Optionally, the power supply 1011 may be logically connected to the processor 1010 through a power management system. In this way, functions such as charge management, discharge management, and power consumption management are implemented by using the power management system.

In addition, the terminal 1000 includes some functional modules that are not illustrated. Details are not described herein.

Optionally, some embodiments of the present disclosure further provide a terminal 1000, including a processor 1010, a memory 1009, and a program stored in the memory 1009 and capable of running on the processor 1010. When the program is executed by the processor 1010, each process of the foregoing embodiment of the method for changing an uplink grant can be implemented, with a same technical effect achieved. To avoid repetition, details are not described herein again.

Figure 11:
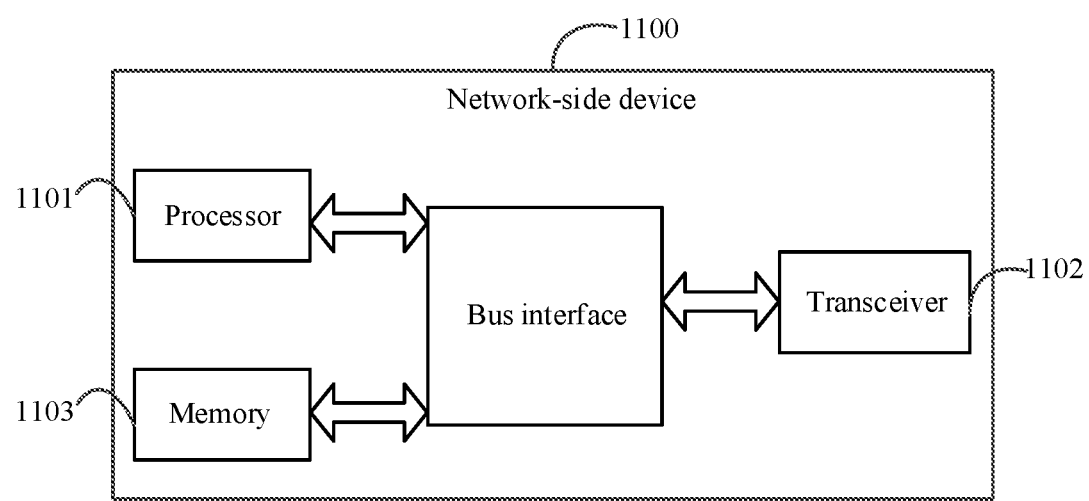
FIG. 11 is another structural diagram of a network-side device according to some embodiments of the present disclosure.

FIG. 11 is a structural diagram of another network-side device according to some embodiments of the present disclosure. As shown in FIG. 11, the network-side device 1100 includes a processor 1101, a transceiver 1102, a memory 1103, and a bus interface.

The transceiver 1102 is configured to:
send configuration information, where the configuration information is used for configuring a change trigger event for a terminal, so that in a case that a logical channel satisfies the change trigger event, the terminal changes an uplink grant usable by the logical channel.

The transceiver 1102 is configured to receive and send data under control of the processor 1101. The transceiver 1102 includes at least two antenna ports.

Optionally, the change trigger event includes at least one of the following:

a data packet loss rate of the logical channel is greater than or equal to a first packet loss rate threshold;

a data transmission delay of the logical channel is greater than or equal to a first delay threshold;

a measurement result of a cell corresponding to the uplink grant usable by the logical channel satisfies a first preset condition; or a measurement result of a target cell satisfies a second preset condition, where the target cell is a cell corresponding to the changed uplink grant usable by the logical channel.

Optionally, the transceiver 1102 is further configured to: receive indication information, where the indication information is used to indicate the change of the uplink grant usable by the logical channel.

Optionally, the indication information includes:

an identifier of at least one of a subcarrier spacing, a physical uplink shared channel range, a type, or a cell that are corresponding to a changed uplink grant; or a sequence number of the logical channel and the identifier.

In FIG. 11, a bus architecture may include any quantity of interconnect buses and bridges, specifically for interconnecting various circuits of one or more processors represented by the processor 1101 and a memory represented by the memory 1103. The bus architecture may further interconnect various other circuits such as a peripheral device, a voltage regulator, and a power management circuit. These are all well known in the art, and therefore are not further described in this specification. The bus interface provides an interface. The transceiver 1102 may be a plurality of components, that is, the transceiver 1102 includes a transmitter and a receiver, and provides a unit for communicating with various other apparatuses on a transmission medium. For different user equipment, a bus interface may also be an interface for externally or internally connecting a required device, and the connected device includes but is not limited to a mini keyboard, a display, a speaker, a microphone, a joystick, or the like.

The processor 1101 is responsible for bus architecture management and general processing. The memory 1103 may store data used when the processor 1101 performs an operation.

Optionally, some embodiments of the present disclosure further provide a network-side device 1100, including a processor 1101, a memory 1103, and a program stored in the memory 1103 and capable of running on the processor 1101. When the program is executed by the processor 1101, each process of the foregoing embodiment of the method for sending information can be implemented, with a same technical effect achieved. To avoid repetition, details are not described herein again.

Some embodiments of the present disclosure further provide a computer-readable storage medium. The computer-readable storage medium stores a computer program, and when the computer program is executed by a processor, each process of the method for sending information on the terminal side according to some embodiments of the present disclosure can be implemented, or when the computer program is executed by a processor, each process of the method for sending information on the network-side device according to some embodiments of the present disclosure can be implemented, with a same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

It may be understood that the embodiments described in the embodiments of the present disclosure may be implemented by hardware, software, firmware, middleware, microcode, or a combination thereof. For hardware implementation, the module, unit, submodule, subunit, or the like may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in the present disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

Therefore, an objective of the present disclosure may also be achieved by running a program or a group of programs on any computing apparatus. The computing apparatus may be a well-known general apparatus. Therefore, the objective of the present disclosure may also be achieved by merely providing a program product including program code for implementing the method or apparatus. To be specific, the program product also constitutes the present disclosure, and a storage medium storing the program product also constitutes the present disclosure. Apparently, the storage medium may be any well-known storage medium or any storage medium that will be developed in the future. It should also be noted that in the apparatus and method of the present disclosure, apparently, the components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for changing an uplink grant, performed by a terminal and comprising:
   in a case that a logical channel satisfies a change trigger event, changing an uplink grant usable by the logical channel;
   wherein the changing an uplink gat usable by the logical channel comprises:
   changing at least one of a subcarrier spacing, a physical uplink shared channel range, a type, or a cell that are corresponding to the uplink grant usable by the logical channel;
   wherein the change trigger event comprises at least one of the following:
   a data packet loss rate of the logical channel is greater than or equal to a first packet loss rate threshold;
   a data transmission delay of the logical channel is greater than or equal to a first delay threshold;
   a measurement result of a cell corresponding to the uplink grant usable by the logical channel satisfies a first preset condition; or
   a measurement result of a target cell satisfies a second preset condition, wherein the target cell is a cell corresponding to a changed uplink grant usable by the logical channel.

2. The method according to claim 1, wherein the cell corresponding to the uplink grant usable by the logical channel comprises a plurality of cells; and
   in a case that the change trigger event comprises that a measurement result of a cell corresponding to the uplink grant usable by the logical channel satisfies a first preset condition, the measurement result of the cell corresponding to the uplink grant usable by the logical channel comprises any one of the following:
   a measurement result of a cell with a highest measurement value among the plurality of cells;
   a measurement result of a cell with a lowest measurement value among the plurality of cells;
   an average measurement result of the plurality of cells; or
   an average measurement result of at least two cells that satisfy a third preset condition among the plurality of cells.

3. The method according to claim 1, wherein the measurement result comprises at least one of the following:
   reference signal received power (RSRP);
   reference signal received quality (RSRQ);
   signal to interference plus noise ratio (SINR);
   received signal strength indication (RSSI);
   channel occupancy ratio (CR); or
   channel busy ratio (CBR).

4. The method according to claim 1, wherein the target cell satisfies at least one of the following:
   in a case that the data packet loss rate of the logical channel is greater than or equal to the first packet loss rate threshold, a data packet loss rate corresponding to the target cell is less than or equal to a second packet loss rate threshold;
   in a case that the data transmission delay of the logical channel is greater than or equal to the first delay threshold, a data transmission delay corresponding to the target cell is less than or equal to a second delay threshold; or
   the measurement result of the target cell satisfies a fourth preset condition.

5. The method according to claim 1, wherein the changing an uplink grant usable by the logical channel comprises:
   in a case that a preset duration is reached after the logical channel satisfies the change trigger event, changing the uplink grant usable by the logical channel.

6. The method according to claim 5, wherein the changing the uplink grant usable by the logical channel in a case that a preset duration is reached after the logical channel satisfies the change trigger event comprises:
   in a case that the preset duration is reached after the logical channel satisfies the change trigger event and that the logical channel still satisfies the change trigger event, changing the uplink grant usable by the logical channel.

7. The method according to claim 5, further comprising:
   before the preset duration is reached after the logical channel satisfies the change trigger event, if the logical channel satisfies a non-change trigger event, skipping changing the uplink grant usable by the logical channel.

8. The method according to claim 1, wherein the change trigger event is prescribed by a protocol; or
   before the changing an uplink grant usable by the logical channel in a case that a logical channel satisfies a change trigger event, the method further comprises:
   receiving configuration information, wherein the configuration information is used for configuring the change trigger event for the terminal.

9. The method according to claim 1, wherein after the changing an uplink grant usable by the logical channel, the method further comprises:
   sending indication information, wherein the indication information is used to indicate the change of the uplink grant.

10. The method according to claim 9, wherein the indication information comprises:
    an identifier of at least one of a subcarrier spacing, a physical uplink shared channel range, a type, or a cell that are corresponding to the changed uplink grant; or
    a sequence number of the logical channel and the identifier.

11. The method according to claim 1, wherein in a case that the measurement result of the cell corresponding to the uplink grant usable by the logical channel satisfies the first preset condition, the first preset condition comprises:
    a threshold for reference signal received quality (RSRQ) of the cell is less than a first threshold, or
    a threshold for channel occupancy ratio (CR) of the cell is equal to or greater than a second threshold.

12. The method according to claim 1, wherein in a case that the change trigger event is the measurement result of the target cell satisfies the second preset condition, the second preset condition comprises:
- a threshold for reference signal received quality (RSRQ) of the target cell is equal to or greater than a third threshold, or
- a threshold for channel occupancy ratio (CR) of the target cell is less than a fourth threshold.

13. A method for sending information, performed by a network-side device and comprising:
- sending configuration information, wherein the configuration information is used for configuring a change trigger event for a terminal, so that in a case that a logical channel satisfies the change trigger event, the terminal changes an uplink grant usable by the logical channel and changes at least one of a subcarrier spacing, a physical uplink shared channel range, a type, and a cell that are corresponding to the uplink grant usable by the logical channel;
- wherein the change trigger event comprises at least one of the following:
- a data packet loss rate of the logical channel is greater than or equal to a first packet loss rate threshold;
- a data transmission delay of the logical channel is greater than or equal to a first delay threshold;
- a measurement result of a cell corresponding to the uplink grant usable by the logical channel satisfies a first preset condition; or
- a measurement result of target cell satisfies a second preset condition, wherein the target cell is a cell corresponding to the changed uplink grant usable by the logical channel.

14. The method according to claim 13, wherein after the sending configuration information, the method further comprises:
- receiving indication information, wherein the indication information is used to indicate the change of the uplink grant usable by the logical channel.

15. The method according to claim 14, wherein the indication information comprises:
- an identifier of at least one of a subcarrier spacing, a physical uplink shared channel range, a type, or a cell that are corresponding to a changed uplink grant; or
- a sequence number of the logical channel and the identifier.

16. A network-side device, comprising a processor, a memory, and a program stored in the memory and capable of running on the processor, wherein when the program is executed by the processor, the steps of the method for sending information according to claim 13 are implemented.

17. A non-transitory computer-readable storage medium, wherein the non-transitory computer-readable storage medium stores a computer program, and when the computer program is executed by a processor, the steps of the method for changing an uplink grant according to claim 1 are implemented.

18. A terminal, comprising a processor, a memory, and a program stored in the memory and capable of running on the processor, wherein the program is executed by the processor to implement:
- in a case that a logical channel satisfies a change trigger event, changing an uplink grant usable by the logical channel;
- wherein the program is further executed by the processor to implement;
- changing at least one of a subcarrier spacing, a physical uplink shared channel range, a type, or a cell that are corresponding to the uplink grant usable by the logical channel;
- wherein the change trigger event comprises at least one of the following:
- a data packet loss rate of the logical channel is greater than or equal to a first packet loss rate threshold;
- a data transmission delay of the logical channel is greater than or equal to a first delay threshold;
- a measurement result of a cell corresponding to the uplink grant usable by the logical channel satisfies a first preset condition; or
- a measurement result of a target cell satisfies a second preset condition, wherein the target cell is a cell corresponding to a changed uplink grant usable by the logical channel.

19. The terminal according to claim 18, wherein in a case that the measurement result of the cell corresponding to the uplink grant usable by the logical channel satisfies the first preset condition, the first preset condition comprises:
- a threshold for reference signal received quality (RSRQ) of the cell is less than a first threshold, or
- a threshold for channel occupancy ratio (CR) of the cell is equal to or greater than a second threshold.

20. The terminal according to claim 18, wherein in a case that the change trigger event is the measurement result of the target cell satisfies the second preset condition, the second preset condition comprises:
- a threshold for reference signal received quality (RSRQ) of the target cell is equal to or greater than a third threshold, or
- a threshold for channel occupancy ratio (CR) of the target cell is less than a fourth threshold.

* * * * *